(12) United States Patent
Charette (10) Patent No.: US 9,666,841 B1
(45) Date of Patent: May 30, 2017

(54) ROUTER HAVING REMOVABLE CELLULAR COMMUNICATION MODULE

(71) Applicant: Keith Charette, Fairfield, CT (US)

(72) Inventor: Keith Charette, Fairfield, CT (US)

(73) Assignee: VENTUS NETWORKS LLC, Norwalk, CT (US)

(*) Notice: Subject to any disclaimer, the term of this patent is extended or adjusted under 35 U.S.C. 154(b) by 0 days.

(21) Appl. No.: 14/976,194

(22) Filed: Dec. 21, 2015

(51) Int. Cl.
H04W 88/02 (2009.01)
H04B 1/38 (2015.01)
H01M 2/10 (2006.01)
H04W 88/08 (2009.01)

(52) U.S. Cl.
CPC .......... *H01M 2/1022* (2013.01); *H04W 88/08* (2013.01); *H01M 2220/30* (2013.01)

(58) Field of Classification Search
CPC .......... H04B 1/3816; H04B 1/38; H01Q 1/22; H01Q 1/2291; H01Q 1/241; H04W 88/16; H04W 88/02; H04W 88/021

USPC .......... 455/557–559, 550.1, 575.1, 129, 351, 455/556.1, 556.2; 361/600, 728, 747
See application file for complete search history.

(56) References Cited

U.S. PATENT DOCUMENTS

| | | | | | |
|---|---|---|---|---|---|
| 5,907,815 | A | * | 5/1999 | Grimm | G06F 1/1616 455/550.1 |
| 2006/0114883 | A1 | * | 6/2006 | Mehta | H04W 80/04 370/352 |
| 2014/0313882 | A1 | * | 10/2014 | Rucker | H04W 4/005 370/219 |

* cited by examiner

*Primary Examiner* — Philip Sobutka
(74) *Attorney, Agent, or Firm* — Grogan, Tuccillo & Vanderleeden, LLP (57) ABSTRACT

A router includes a printed circuit board, a housing enclosing the printed circuit board, the housing having a recess formed therein, and a removable cell pack containing a cellular module configured to be received within the recess and electrically connected to the printed circuit board.

12 Claims, 10 Drawing Sheets

ROUTER HAVING REMOVABLE CELLULAR COMMUNICATION MODULE

FIELD OF THE INVENTION

The present invention relates to routers and, more particularly, to a wireless router having a removable cell pack.

BACKGROUND OF THE INVENTION

A wireless router is a device that performs the functions of a router and also includes the functions of a wireless access point. It is used to provide access to the Internet or a private computer network. It can function in a wired local area network (LAN), in a wireless-only LAN (WLAN), or in a mixed wired/wireless network. In particular, wireless routers offer a convenient way to connect a small number of wired and any number of wireless devices to each other for access to the Internet as well as for file sharing and printing.

Existing wireless routers typically allow for connection to both wired and mobile broadband networks. Such routers can access the Internet via an Internet Service Provider or via a mobile broadband connection, such as through a 3G, 4G, LTE or similar cellular network.

In connection with the above, existing wireless routers typically include an embedded cellular module that enables access to a mobile broadband network at any location where there is cellular service, which is desirable when a wired or wireless connection to the Internet through an Internet Service Provider is unavailable. The cellular module is typically connected to the printed circuit board (PCB) of the router using connectors. In order to establish an antenna connection, wires are manually connected between the cellular module and the PCB of the router using u.FL connectors, although other means of connection known in the art such as soldering and the like have also been utilized. As will be readily appreciated, however, u.FL connectors are very delicate, making the antenna connection particularly difficult. A router housing encloses the PCB and the cellular module.

In order to activate the cellular connection to the mobile broadband network, a user may typically insert a universal integrated circuit card, also referred to more commonly as a SIM card, or other similar format card, containing a user's identifying information and account information into a slot in the housing. Alternatively, but less common, a user's identifying and account information may be stored within the cellular module itself. In either case, existing wireless routers do not allow for easy consumer configuration or customization. For example, if a consumer wishes to reconfigure the router to allow for communications over a different broadband network, a different cellular module and SIM card must be installed. This requires a fair amount of skill, in excess of what a typical consumer may possess. In particular, in order to swap the cellular module for a different one, the housing must be opened, the existing cellular module removed and a new cellular module installed. As stated above, this requires a consumer to mount the cellular module to the PCB and manually establish wire connections between the cellular module and the antenna terminal connections on the PCB of the router, a fairly laborious and skill-intensive process.

In view of the above, there is a need for a wireless router having a removable cell pack which enables a consumer to easily and quickly configure the router for use with any high-speed mobile broadband network.

SUMMARY OF THE INVENTION

It is an object of the present invention to provide a wireless router.

It is another object of the present invention to provide a wireless router that can be easily customized to enable connection to any high-speed mobile broadband network.

It is another object of the present invention to provide a wireless router having a removable cell pack.

It is another object of the present invention to provide a wireless router that provides for the automatic switching between internal and external antennas.

These and other objects are achieved by the present invention.

According to an embodiment of the present invention, a router is provided. The router includes a printed circuit board, a housing enclosing the printed circuit board, the housing having a recess formed therein, and a removable cell pack containing a cellular module configured to be received within the recess and electrically connected to the printed circuit board.

According to another embodiment of the present invention, a router is provided. The router includes a printed circuit board, a housing enclosing the printed circuit board, the housing having a recess formed therein, a plurality of spring-loaded RF connectors connected to the printed circuit board and extending into the recess, and a retaining clip connected to the printed circuit board adjacent to the spring-loaded RF connectors and extending into the recess. The plurality of spring-loaded RF connectors are configured to establish an electrical connection with a cellular module received within the recess. The retaining clip is configured to selectively retain the cellular module within the recess.

According to yet another embodiment of the present invention, a cell pack for use with a wireless router is provided. The cell pack includes a housing having an angled forward surface, a pair of opposed locating apertures formed in a bottom of the housing, at least one slot formed in a side of the housing, and a cellular module contained within the housing. A terminal end of the cellular module extends from the housing opposite the angled forward surface.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENTS

Figure 1:
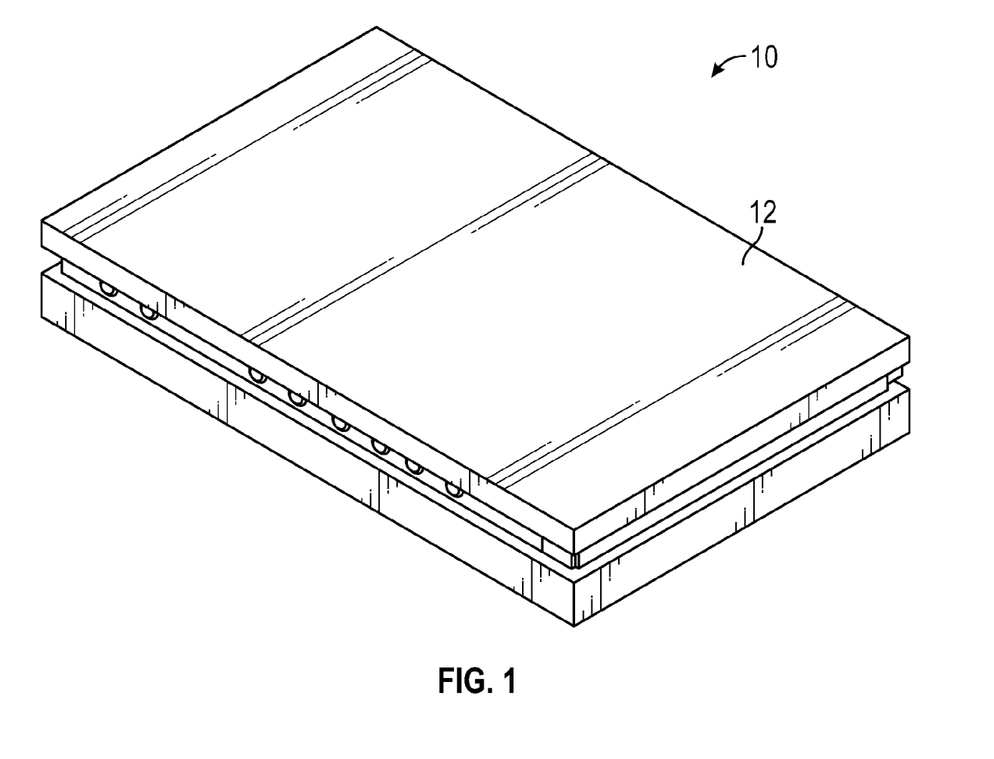
FIG. 1 is a perspective view of a wireless router according to an embodiment of the present invention.
Figure 2:
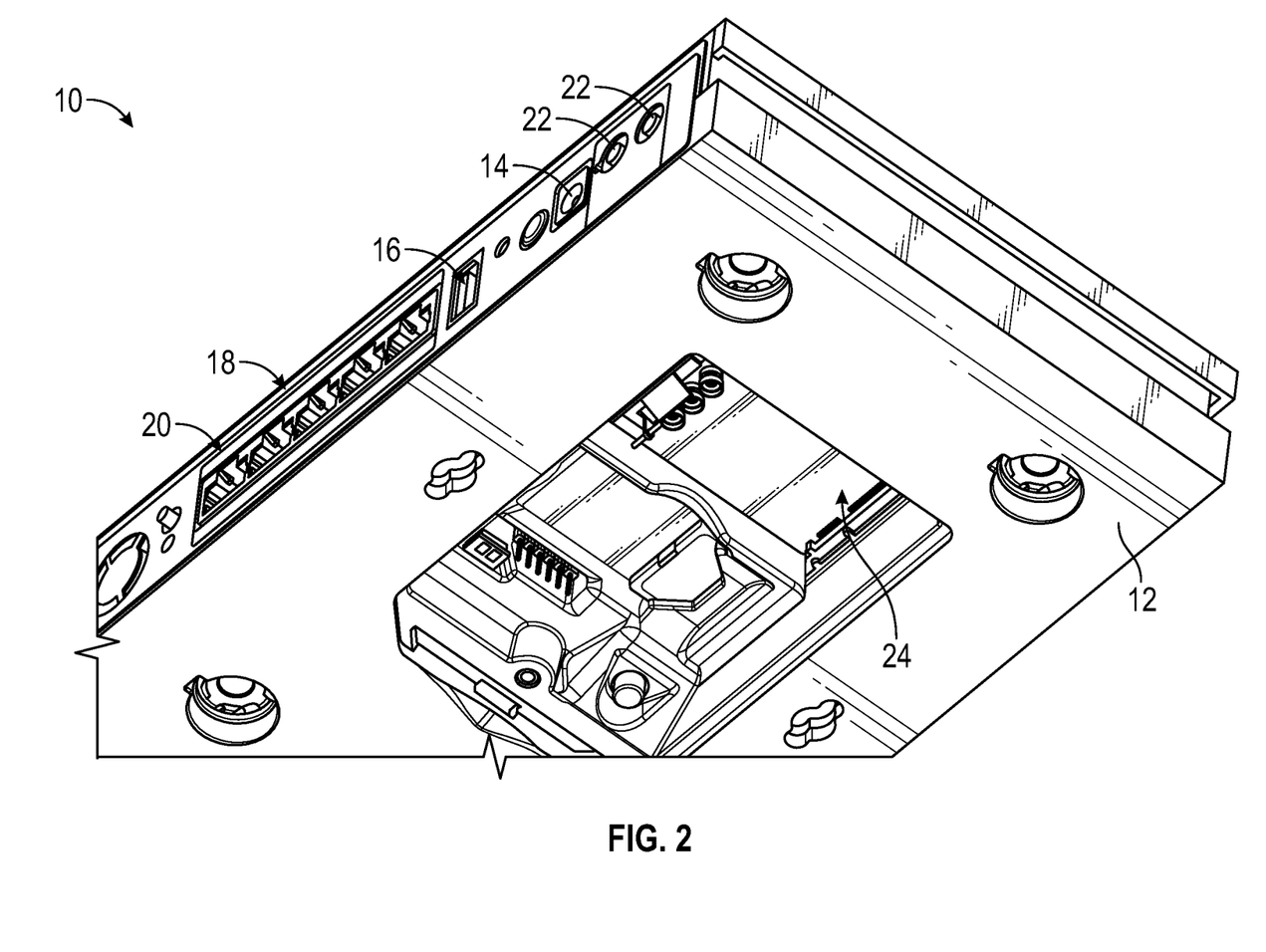
FIG. 2 is a perspective, bottom view of the wireless router of FIG. 1.

Referring to FIGS. 1 and 2, a wireless router 10 according to an embodiment of the present invention is illustrated. The wireless router 10 may be generally of the type known in the art and is configured to perform the functions of a router and/or a wireless access point, as is known in the art. For example, the router 10 provides both wired and wireless connectivity to a number of local networked devices, such as a computer and laptop computer, for example by Wi-Fi and Ethernet. Furthermore, a mobile device such as a mobile phone, smart phone or tablet computer can connect to the router 10. In order to communicate with network entities external to the local area network, the router 10 can connect with an ISP network using a DSL connection or other connection known in the art. In addition, the router 10 can connect with a mobile broadband network where the ISP network is unavailable, utilizing a cellular module contained within the housing, as discussed in detail below.

For example, the wireless router 10 may form a bridge between a commercial or proprietary wide-area network (WAN) and a TCP/IP compatible port or ports or other application specific I/O facilities. Typically, the cellular-wireless router includes a CPU, at least one cellular transceiver, an Ethernet PHY and either an integrated cellular antenna or connection facilities for an external cellular antenna. Connectivity between the router and associated/supported peripheral equipment may be via metallic circuit, optical fiber, optical broadcast or wireless methods.

In connection with the above, the router 10 may have a number of ports accessible from the rear of the housing 12 that provide a variety of features and functionality commonly known in the art. For example, as illustrated in FIG. 2, the router 10 may include a power port 14 for connecting a power source to the router 10, a USB port 16, a plurality of LAN ports 18, and a WAN port 20. In addition, the router 10 may included a pair of terminals 22 for connecting an external cellular antenna, as discussed in detail hereinafter.

Figure 3:
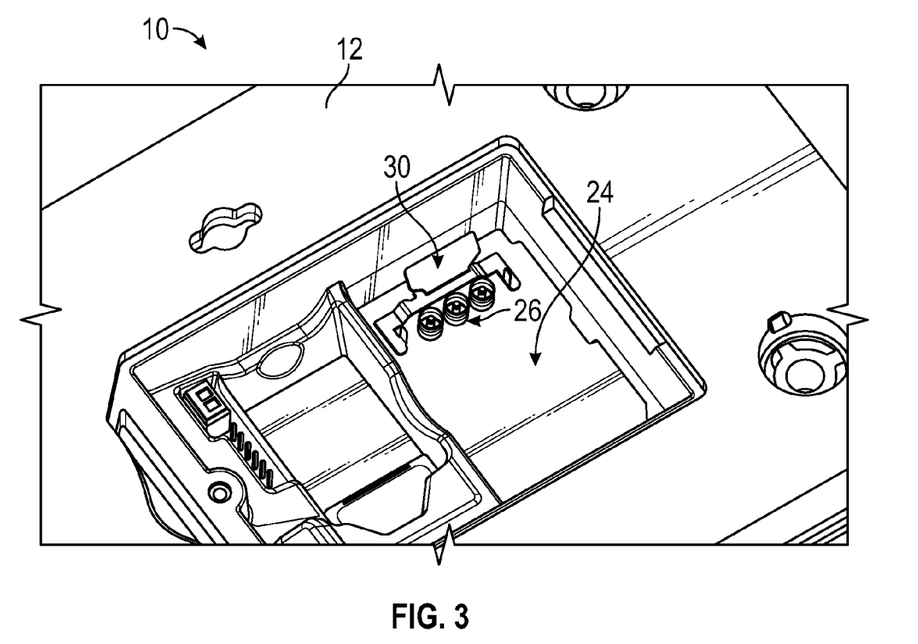
FIG. 3 is an enlarged, perspective, bottom view of the wireless router of FIG. 1.
Figure 4:
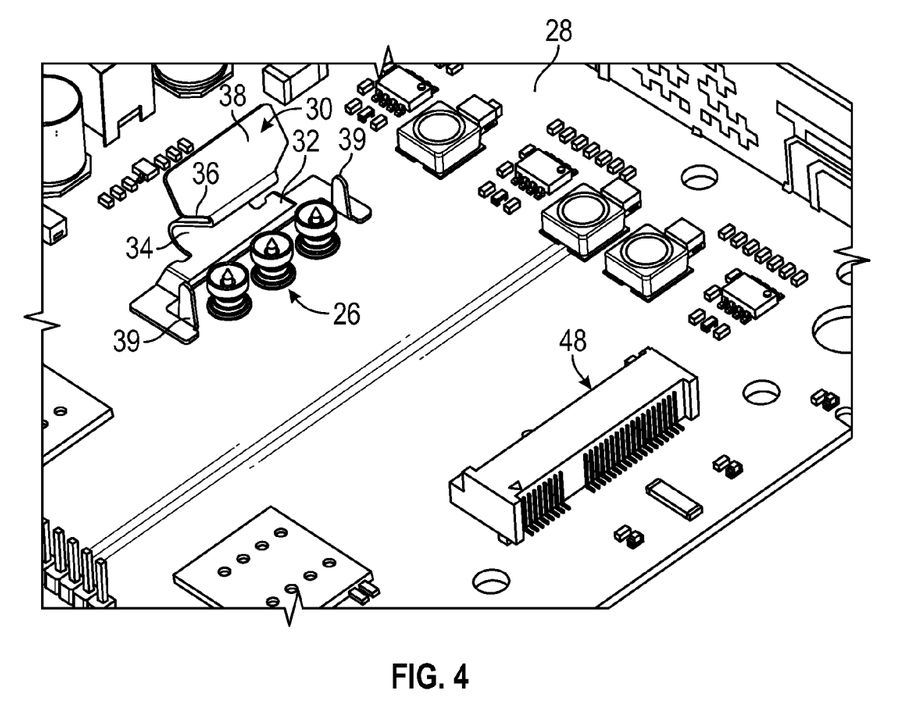
FIG. 4 is a perspective view of a printed circuit board of the wireless router of FIG. 1.
Figure 5:
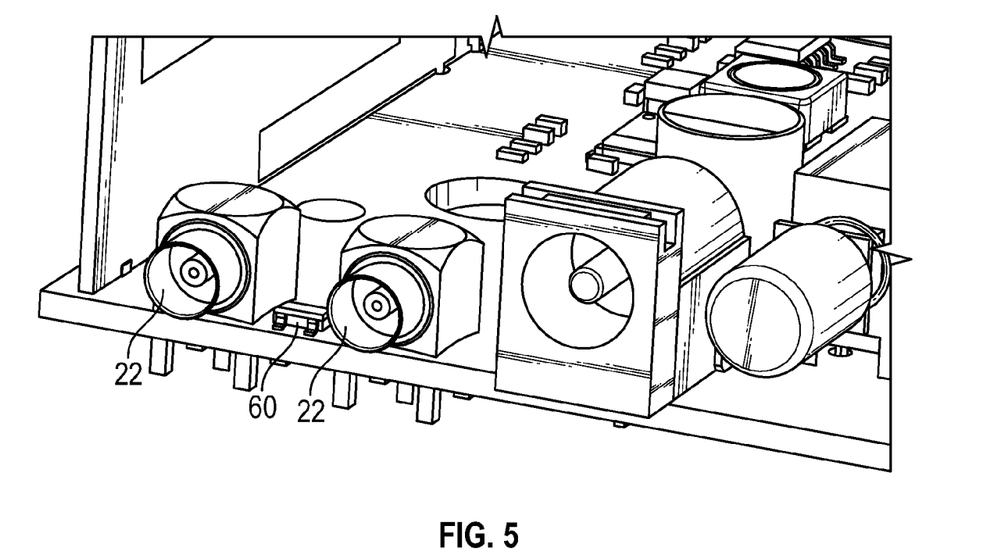
FIG. 5 is an enlarged, perspective, side view of the printed circuit board of the wireless router of FIG. 1.

As best illustrated in FIGS. 2, 3 and 4 the housing 12 of the router 10 is formed with a generally rectangular recess or cavity 24 in the bottom thereof. A plurality of spring-loaded or compression RF coaxial connectors 26 of the type known in the art are electrically coupled to the printed circuit board (PCB) 28 within the housing 12 and extend through the bottom floor of the housing 12 into the recess 24. As shown therein, the connectors 26 are aligned in a row. In addition, a retaining clip 30 is affixed to the PCB 28 and extends through the bottom floor of the housing 12 into the recess 24. The RF connectors 26 and the retaining clip 30 are configured to facilitate the secure and easy connection of a cellular module to the PCB 28, as discussed hereinafter. FIG. 4 illustrates the spring-loaded RF connectors 26 and retaining clip 30 on the PCB 28, with the housing 12 not shown. In the preferred embodiment, there are three RF connectors 26 (one for a GPS antenna connection and two for cellular antenna connections), although more or fewer RF connectors may be utilized without departing from the broader aspects of the present invention. As shown in FIG. 5, the PCB 28 also includes the pair of terminals 22 for connecting an external cellular antenna to the router 10. The terminals 22 are electrically connected to the RF connectors 26 through traces (not shown) in the PCB 28. Alternatively, the terminals 22 may be electrically connected to the RF connectors 26 via one or more coaxial cables.

As best illustrated in FIG. 4, the retaining clip 30 may be fixedly attached the PCB 28 adjacent to the spring-loaded RF connectors 26 through means known in the art such as by soldering or welding, although other means of attachment known in the art such as fasteners or screws may also be utilized. The retaining clip 30 is preferably formed from a relatively thin piece of stamped, bent metal or other resilient material providing some degree of flexibility and includes a generally planar base portion 32 raised a distance above the PCB 28 and oriented substantially parallel to the PCB 28, a curved second portion 34 extending from the base portion 32 generally away from the spring-loaded RF connectors, an angled third portion 36 extending from the second portion 34 to a point generally above the spring-loaded RF connectors 26, and a tab 38 extending from the angled third portion 36 generally upwards and away from the RF connectors 26. The retaining clip may also include a pair of opposed locating projections 39 extending upwards from the PCB 28 on opposing sides of the spring-loaded RF connectors 26, the purpose of which will be discussed hereinafter.

Figure 6:
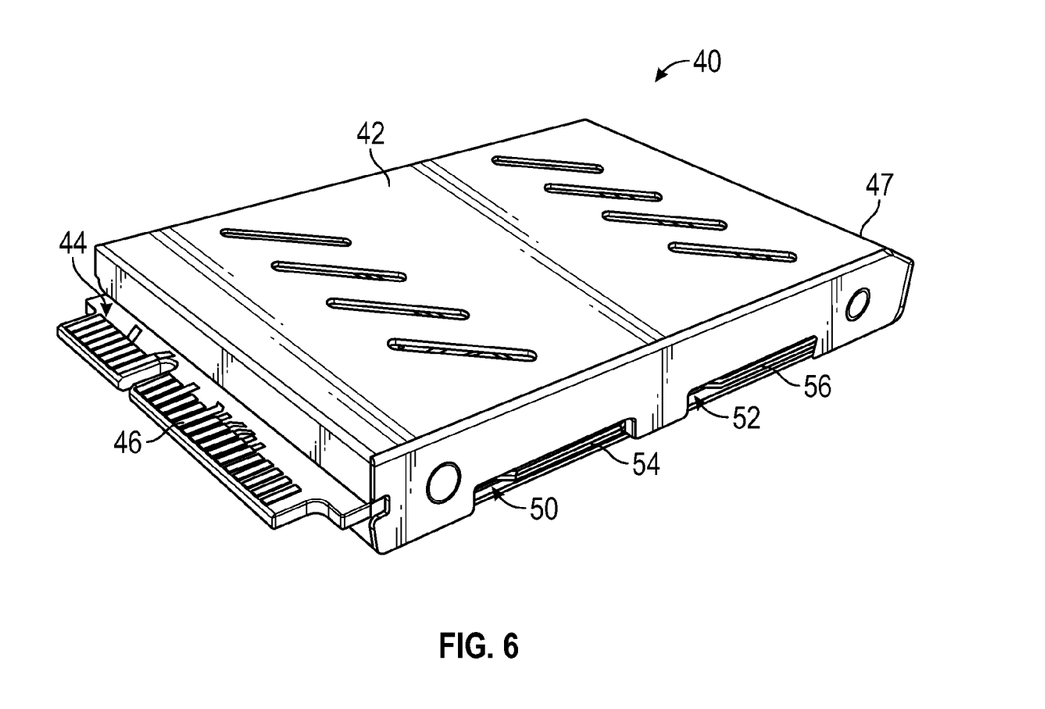
FIG. 6 is a perspective, top view of a removable cell pack used with the wireless router of FIG. 1.
Figure 7:
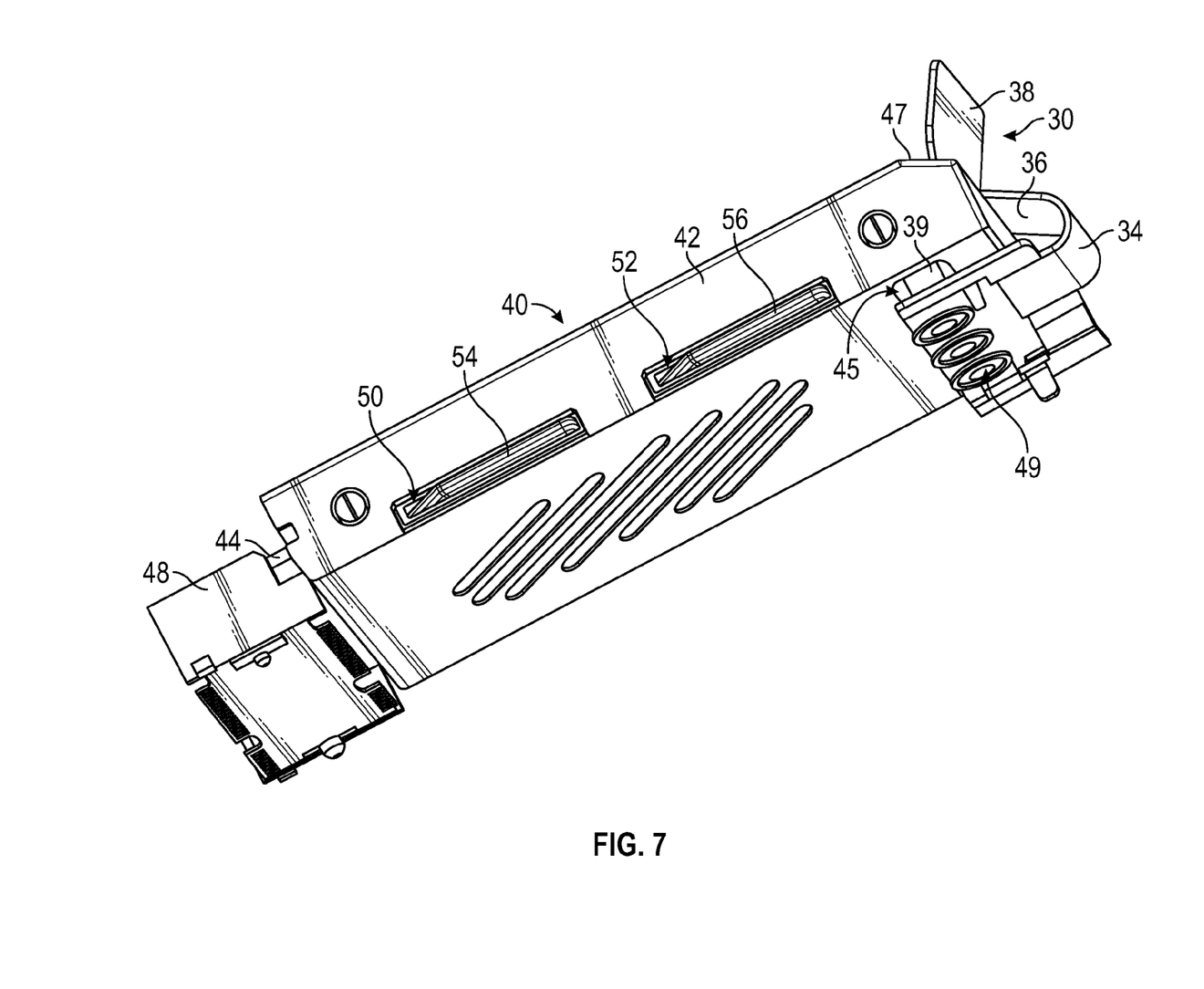
FIG. 7 is a perspective, bottom view of the removable cell pack of FIG. 6.

Referring now to FIGS. 6 and 7, a removable cell pack 40 configured for use with the router 10 is illustrated. The cell pack 40 includes a generally rectangular housing 42 enclosing a cellular module 44. The cellular module 44 may be of any type known in the art and is configured to provide access to a mobile broadband network at any location where there is cellular service. The cellular module may be based on any interconnect standard such as, for example, a Mini PCI Express Module (mPCIe). As shown, the cellular module 44 has a plurality of electrical terminals 46 that extend through a slot in the housing 42 and are configured to be received by a corresponding port 48 in the PCB 28. The port 48 is preferably configured with the same interconnect standard as the cellular module. As best shown in FIG. 7, a plurality of apertures 49 are formed in the bottom of the housing 42 opposite the terminals 46. These apertures 49 are configured to receive the spring-loaded RF connectors 26 of the PCB 28 therethrough in order to establish a connection with the bottom of the cellular module 44, and thus establish an antenna connection, as discussed hereinafter. For purposes of illustration, FIG. 7 shows the RF connectors 26 and the retaining clip 30 in relation to the cellular module 40, even though these components actually form part of the PCB 28. In an alternative embodiment, the spring-loaded RF connectors 26 may be integrated with the cell pack 40, rather than the PCB 28.

As also shown in FIGS. 6 and 7, the housing 42 of the cell pack 40 has an angled surface 47 at the end opposite from where the cellular module terminals 46 extending from the housing 42. The bottom of the housing 42 is also formed with a pair of opposed locating apertures 45 that are configured to receive the locating projections 39 of the retaining clip 30, as discussed hereinafter.

As further illustrated in FIGS. 6 and 7, the cell pack 40 also includes a pair of slots 50, 52 formed in the side thereof for receiving SIM cards 54, 56 or other similar devices containing user identifying information and account information, as is known in the art. Alternatively, user and account information may be stored in the cellular module 44 itself. Where SIM cards are utilized, the cards 54, 56 are configured to electrically interface with the cellular module 44 to enable the connection to the cellular network of a particular carrier. Although two slots 50, 52 are illustrated for receiving a pair of SIM cards, the cell pack 40 may be configured with more or fewer than two slots, without departing from the broader aspects of the present invention.

Importantly, the cell pack 40 integrates the cellular module 44 and the SIM cards 54, 56 into a single unit that can be quickly and easily installed and removed from the router 10, as shown in FIGS. 8-13. Importantly, the SIM cards (more accurately, universal integrated circuit cards) interface directly with the circuit board defining the core of the cellular module 44. More specifically, the SIMS cards are configured to mate directly with connectors formed on the back of the cellular module 44. This is in contrast to existing devices where the SIM cards typically interface instead with the PCB 28 of the router 10 (and indirectly with the cellular module through connectors).

The router 10 is also configured with an internal or external control feature to allow for the selection of a SIM card (in the case two are utilized) to be activated. In the preferred embodiment, the cell pack 40 itself contains a control module or processor configured to control which SIM card is to be activated (internal control). Alternatively, the control module may be integrated with the PCB of the router 10, external to the cellular pack 40 (external control).

Figure 8:
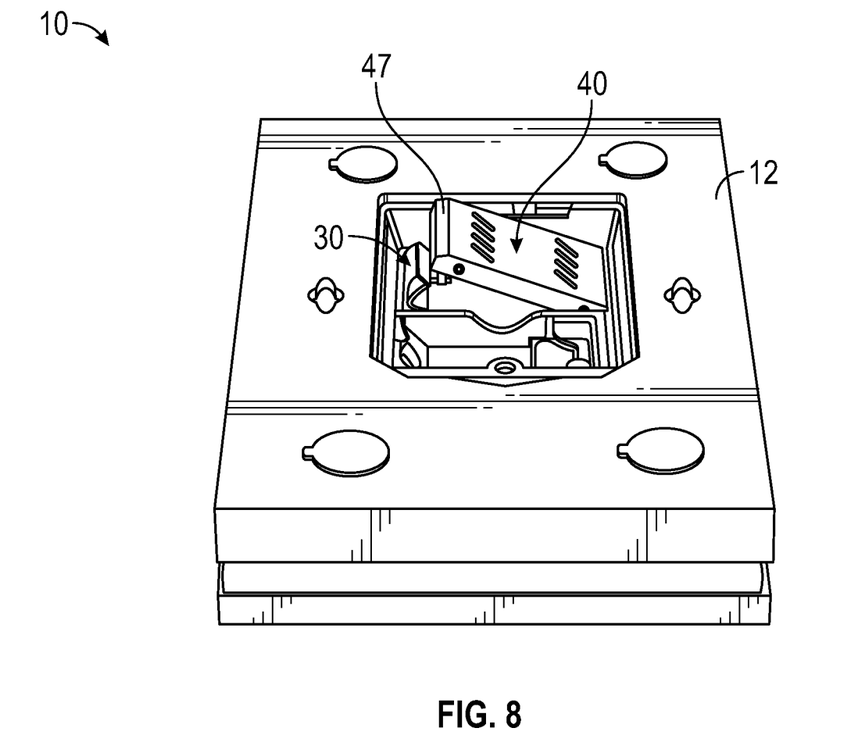
FIG. 8 is a perspective, bottom view of the wireless router of FIG. 1, illustrating insertion of the removable cell pack.
Figure 9:
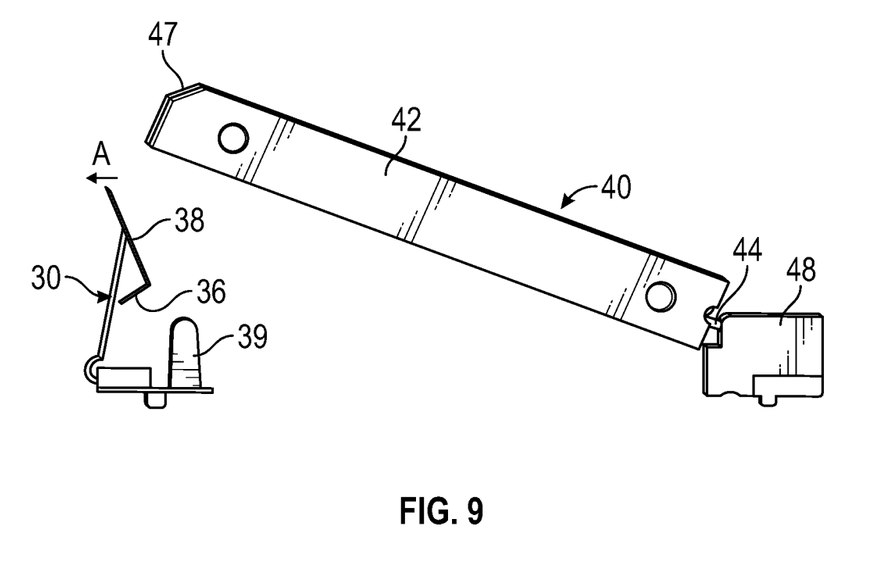
FIG. 9 is a side elevational view of the removable cell pack, illustrating insertion of the cell pack into the wireless router.
Figure 10:
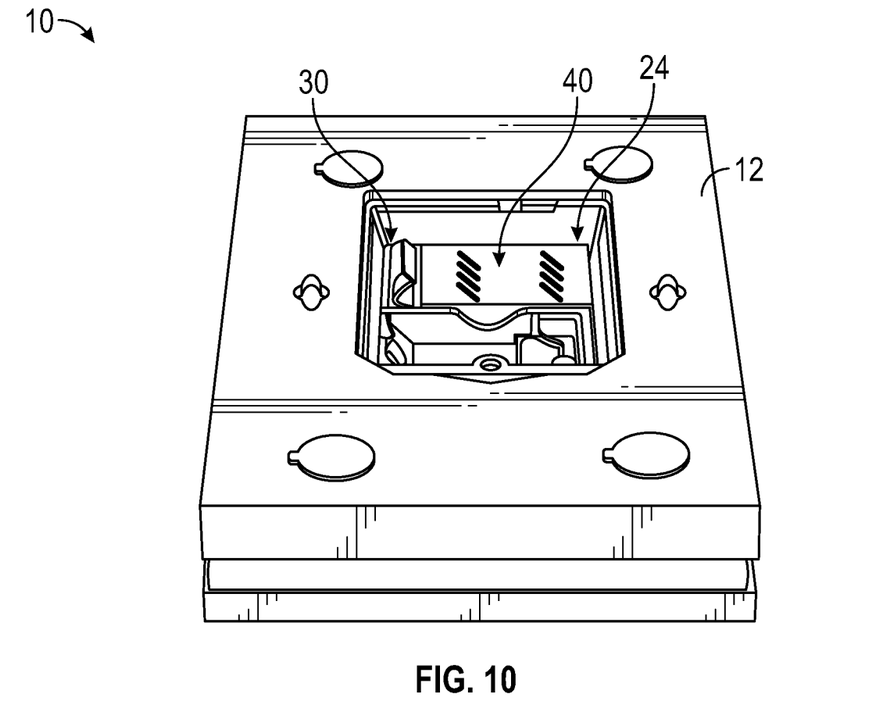
FIG. 10 is a perspective, bottom view of the wireless router of FIG. 1, shown with the removable cell pack installed.
Figure 11:
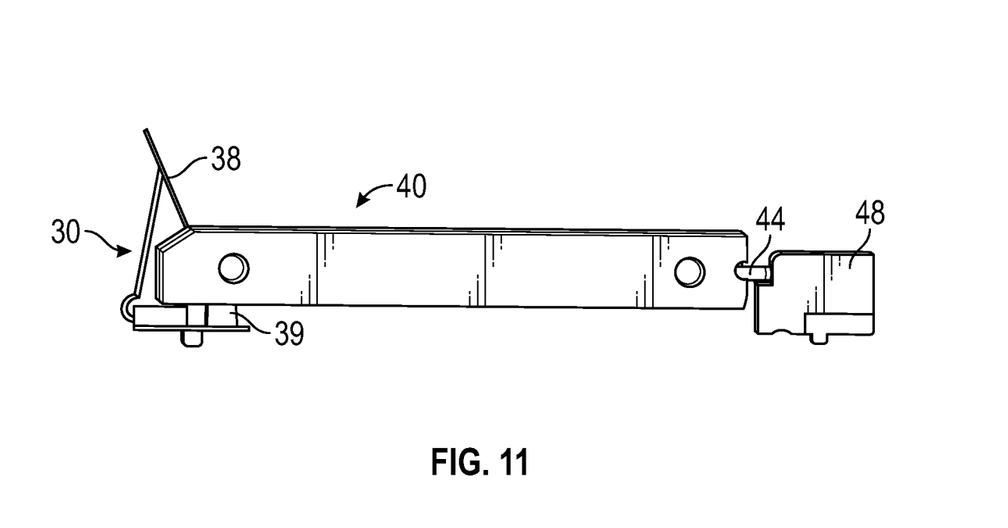
FIG. 11 side elevational view of the removable cell pack installed in the wireless router.

As shown in FIGS. 8 and 9, to insert the cell pack 40 into the router 10, the electrical terminals 46 of the cellular module 44 are first inserted into the port 48 that extends from the PCB 28 into the recess 24 in the router housing 12 by dropping the cell pack 40 into the recess 24 at an angle. The forward end of the cell pack 40 is then pushed downward, as illustrated in FIGS. 10 and 11. As the cell pack 40 is pushed downward, the bottom, forward edge of the cell pack contacts the tab 38 of the retaining clip 30, biasing the tab 38 outward in the direction of arrow A (illustrated in FIG. 9) until the leading edge of the housing 42 clears the tab 38. Once the housing 42 clears the tab 38, the clip 30 snaps back to its original position, shown in FIG. 11. In this position, the angled surface 47 of the cell pack 40 lies beneath the angled portion 36 of the retaining clip 30, as shown in FIGS. 7 and 11. At the same time, the locating projections 39 of the retaining clip 30 are received in the corresponding locating apertures 45 in the housing 42 of the cell pack 40. This functions to align the antenna contacts of the cellular module 44 with the spring-loaded RF connectors 26 on the PCB 28.

Figure 12:
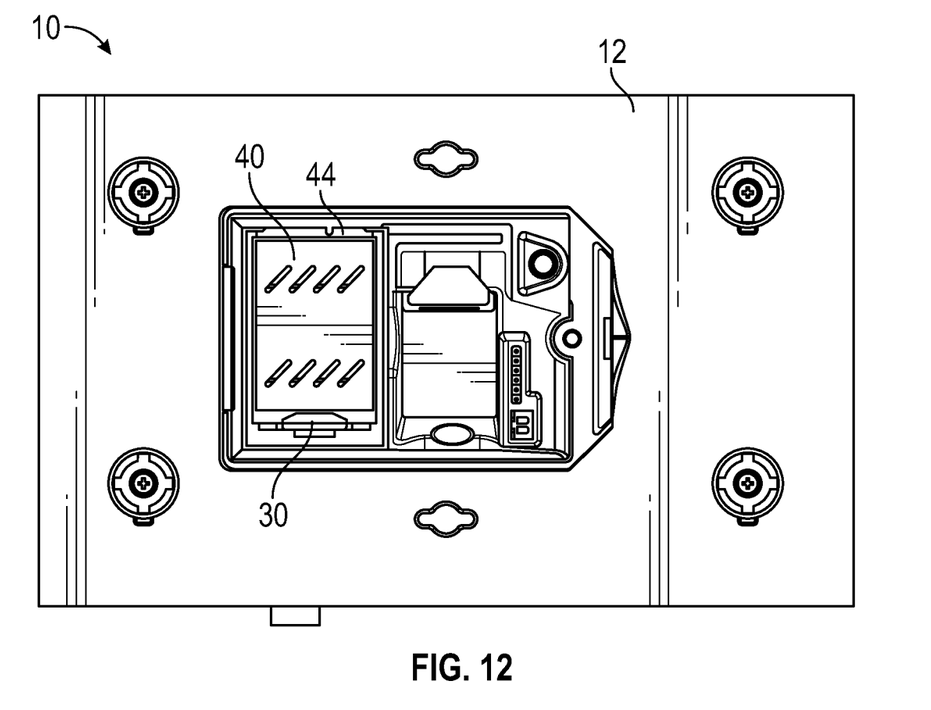
FIG. 12 is a bottom, plan view of the wireless router of FIG. 1, shown with the removable cell pack installed.
Figure 13:
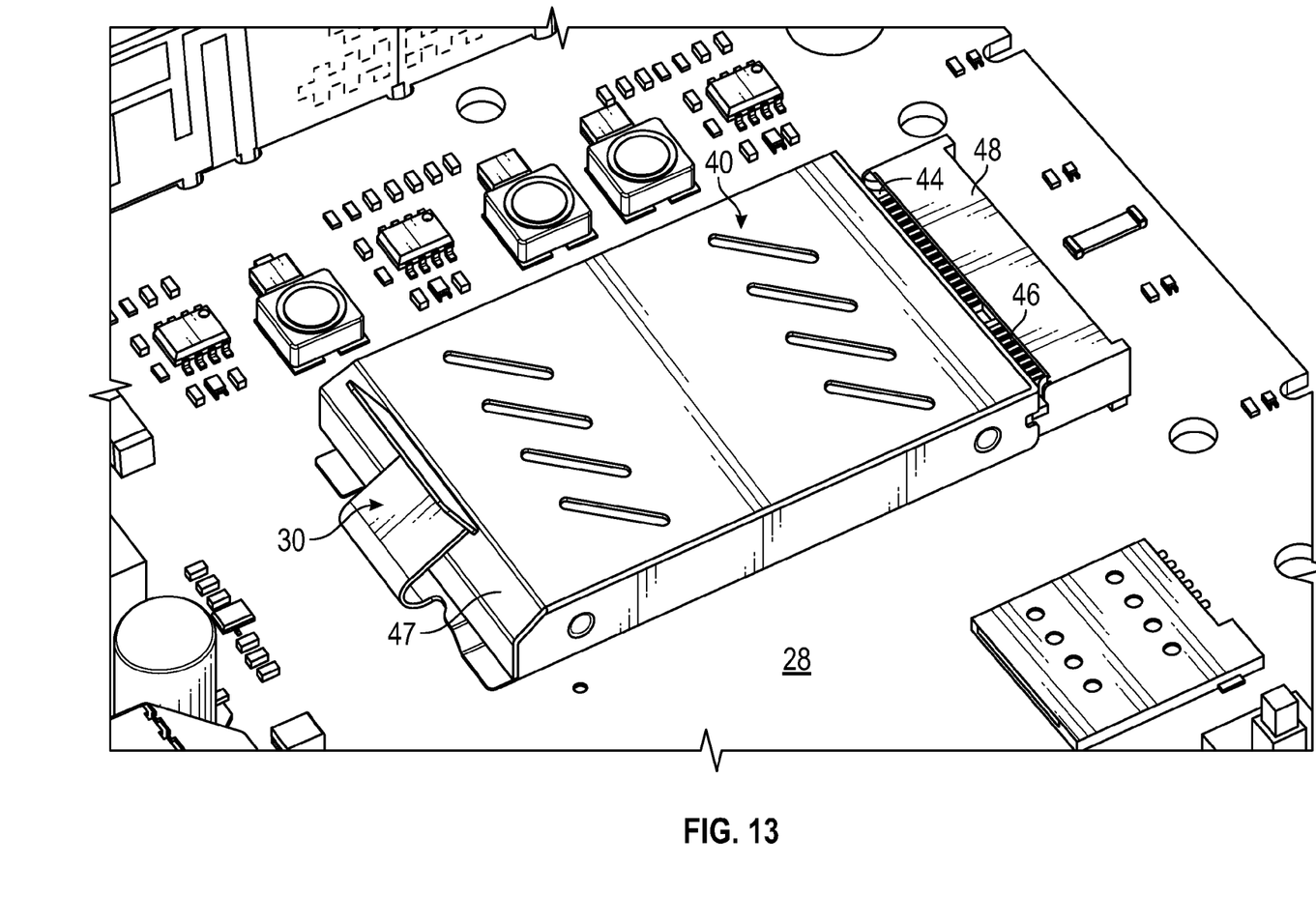
FIG. 13 is a perspective view of the printed circuit board of the wireless router, showing the removable cell pack installed thereon.

Importantly, the engagement of the angled portion 36 of the clip 30 with the angled surface 47 of the housing 42 of the cell pack 40, and the receipt of the locating projections 39 of the clip 30 within the corresponding locating apertures 45 in the housing 42 ensures that the cell pack 40 is held securely and reliably within the recess 24 in the router housing 12. In addition, these locating and retaining features ensure that the antenna connection between the cellular module 44 and the RF connectors 26 on the PCB 28 is substantially vertical and is reliable and secure, which is critical for optimum performance. FIGS. 10, 12 and 13 illustrate the cell pack 40 in installed position within the recess 24 in the router housing 12 (FIG. 13 showing the installed position with the housing 12 omitted).

In connection with the above, when a consumer desires to replace the cell pack 40, so as to connect to a different broadband network not possible with the existing cell pack, or to replace a defective cellular module, the existing cell pack can be easily removed by grasping the tab 38 of the retaining clip 30 and urging it outward, and then lifting the cell pack out of the recess 24. A new cell pack having a new/different cellular module contained therein can then be quickly and easily installed, in the manner discussed above. As will be readily appreciated, the cell pack of the present invention allows a consumer to easily and quickly install or swap cellular modules within a wireless router without requiring any soldered or other delicate RF antenna connections between the cellular module and the PCB, which are required with existing devices. To the contrary, with the present invention, the required antenna connections are established simply by pushing the cell pack 40 into the recess 24 in the router housing 12. Where a consumer desires to use the router 10 with a different cellular carrier, the existing cell pack can be removed just as easily, different SIM cards installed in the slots in the housing, and the cell pack again inserted into the recess 24. As will be readily appreciated, integrating the cellular module and the SIM cards into a single housing that can be quickly and easily removed and installed allows for consumer configuration of the router with various cellular providers.

Figure 14:
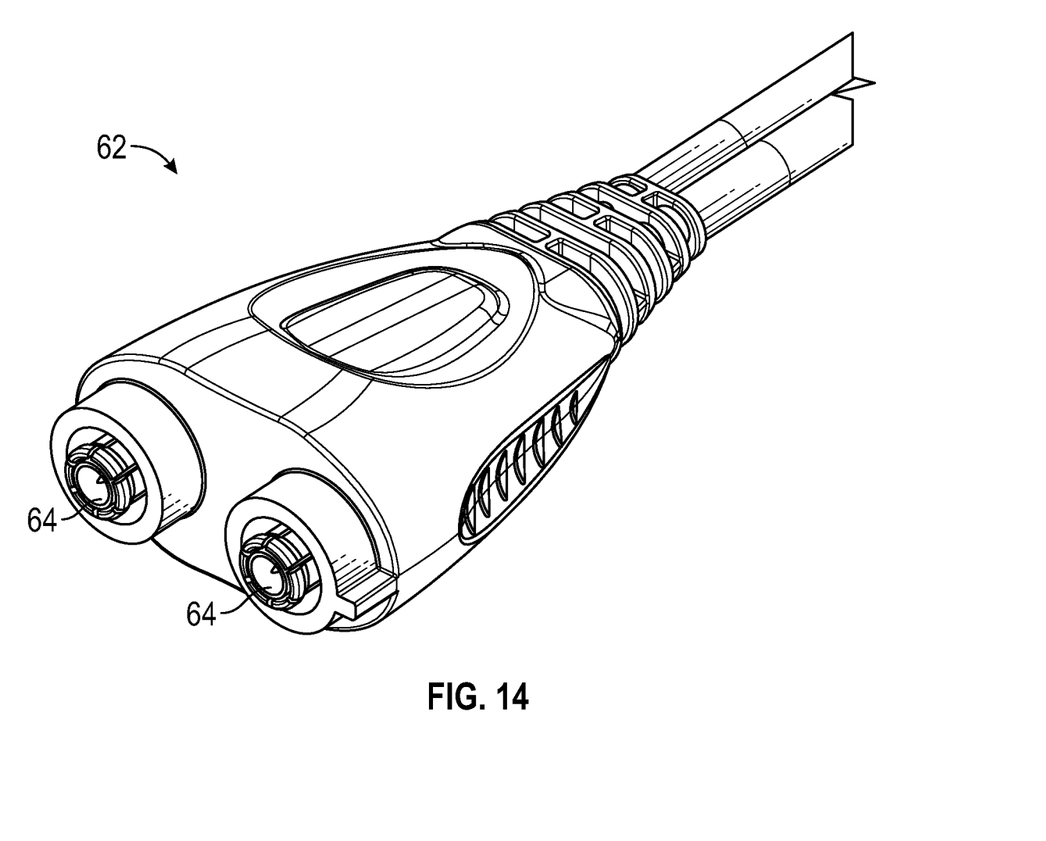
FIG. 14 is a perspective view of the terminal end of an external antenna cable, configured for use with the wireless router of FIG. 1.

Referring now to FIGS. 5 and 14, the router 10 of the present invention provides for a new type of connection to an external antenna providing a number of distinct advantages over existing devices. As discussed above, the router 10 has a pair of terminals 22 accessible from the back of the router 10 for connecting an external cellular antenna. The terminals 22 are electrically connected to the RF connectors 26, and thus the cellular module 40, through traces (not shown) in the PCB 28. As illustrated in FIG. 5, the router 10 also includes a magnetic antenna switch 60 having a magnetic sensor mounted on the PCB 28 that provides for selective electrical connection between the cellular module and either the router's internal antenna or an external antenna, when connected. The magnetic switch 60 is configured to detect when an external antenna is connected to the router and to automatically switch from the internal antenna to the external antenna when the external antenna is connected. Although a magnetic switch is illustrated herein, other types of switches known in the art may be utilized, such as mechanical switches.

In connection with the above, and with particular reference to FIG. 14, in an embodiment, an external antenna having a magnetic connector 62 is illustrated. The magnetic connector 62 may include a pair of RF terminals 64 configured to be mate with the terminals 22 on the back of the router 10 and includes an over molded magnet (not shown). When the connector 62 is brought into registration with the external antenna terminals 22 of the router, the magnet within the connector 62 activates the magnetic switch 60, causing an automatic switch from the internal antenna to the now-connected external antenna without a substantial loss in bandwidth.

Importantly, the external antenna connection scheme contained within the router 10 obviates the need for two separate RF coaxial connectors, which has heretofore been standard in the art. As a result, issues with the loss of bandwidth when connecting an external antenna and manually switching to the external antenna may be obviated or minimized.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A router, comprising:
a printed circuit board;
a housing enclosing the printed circuit board, the housing having a recess formed therein;
a removable cell pack containing a cellular module configured to be received within the recess and electrically connected to the printed circuit board;
a plurality of spring-loaded RF connectors connected to the printed circuit board and extending into the recess, the plurality of spring-loaded RF connectors being configured to establish an electrical connection with antenna terminals on the cellular module;
a retaining clip connected to the printed circuit board adjacent to the spring-loaded RF connectors and extending into the recess, the retaining clip being configured to selectively retain the cell pack within the recess;
a pair of RF antenna terminals extending from the housing of the router, the pair of RF antenna terminals being electrically connected to the spring-loaded RF connectors via one of traces in the printed circuit board and a coaxial cable; and
a switch associated with the pair of RF antenna terminals, the switch being configured to automatically switch from an internal antenna to an external antenna when an external antenna is connected to the router via the pair of RF antenna terminals.

2. The router of claim 1, wherein:
the cell pack includes a generally rectangular housing having an angled forward surface that engages the retaining clip, a pair of opposed locating apertures formed in a bottom of the housing, and at least one slot formed in a side of the housing;
wherein the cellular module is contained within the housing and includes a plurality of terminals extending from the housing of the cell pack opposite the angled forward surface.

3. The router of claim 2, wherein:
the retaining clip includes a pair of opposed locating projections extending upwards from the printed circuit board on opposing sides of the spring-loaded RF connectors and into the recess;
wherein the opposed locating projections are configured to be received in corresponding locating apertures in a bottom of the cell pack.

4. The router of claim 3, wherein:
the retaining clip includes a base portion, a curved second portion extending from the base portion generally away from the spring-loaded RF connectors, an angled third portion extending from the second portion to a point generally above the spring-loaded RF connectors, and a tab extending from the angled third portion generally upwards and away from the spring-loaded RF connectors; and
wherein the angled third portion is configured to mate with a corresponding angled portion on a housing of the cell pack to retain the cell pack within the recess.

5. The router of claim 1, wherein:
the switch is a magnetically activated switch.

6. The router of claim 1, wherein:
the plurality of spring-loaded RF connectors are three spring-loaded RF connectors.

7. A router, comprising:
a printed circuit board;
a housing enclosing the printed circuit board, the housing having a recess formed therein;
a plurality of spring-loaded RF connectors connected to the printed circuit board and extending into the recess, the plurality of spring-loaded RF connectors being configured to establish an electrical connection with a cellular module received within the recess;
a retaining clip connected to the printed circuit board adjacent to the spring-loaded RF connectors and extending into the recess, the retaining clip being configured to selectively retain the cellular module within the recess;
a pair of RF antenna terminals extending from the housing, the pair of RF antenna terminals being electrically connected to the spring-loaded RF connectors via traces in the printed circuit board;
a switch associated with the pair of RF antenna terminals, the switch being configured to automatically switch from an internal antenna to an external antenna when an external antenna is connected to the router via the pair of RF antenna terminals.

8. The router of claim 7, wherein:
the retaining clip includes a pair of opposed locating projections extending from the printed circuit board on opposing sides of the spring-loaded RF connectors and into the recess;
wherein the opposed locating projections are configured to be received in corresponding locating apertures in a bottom of a cell pack containing the cellular module.

9. The router of claim 8, wherein:
the retaining clip includes a base portion, a curved second portion extending from the base portion generally away from the spring-loaded RF connectors, an angled third portion extending from the second portion to a point generally above the spring-loaded RF connectors, and a tab extending from the angled third portion generally away from the spring-loaded RF connectors; and
wherein the angled third portion is configured to mate with a corresponding angled portion on the cell pack to retain the cell pack within the recess.

10. The router of claim 1, wherein:
the switch is a magnetically controlled switch.

11. The router of claim 7, wherein:
the plurality of spring-loaded RF connectors are three spring-loaded RF connectors.

12. The router of claim 7, wherein:
the router is a wireless router.

* * * * *